United States Patent
Hyodo et al.

(10) Patent No.: US 8,191,279 B2
(45) Date of Patent: Jun. 5, 2012

(54) TAPE CHECKING APPARATUS

(75) Inventors: Shinichi Hyodo, Tokyo (JP); Norio Suzuki, Tokyo (JP); Toyomi Arakawa, Tokyo (JP)

(73) Assignee: Japan Tobacco Inc., Tokyo (JP)

( * ) Notice: Subject to any disclaimer, the term of this patent is extended or adjusted under 35 U.S.C. 154(b) by 0 days.

(21) Appl. No.: 13/176,545

(22) Filed: Jul. 5, 2011

(65) Prior Publication Data
US 2011/0258871 A1    Oct. 27, 2011

Related U.S. Application Data

(63) Continuation of application No. PCT/JP2010/053548, filed on Mar. 4, 2010.

(30) Foreign Application Priority Data

Mar. 13, 2009    (JP) .................................. 2009-061168

(51) Int. Cl.
*G01B 7/04* (2006.01)
*G01B 7/06* (2006.01)

(52) U.S. Cl. ........................................... 33/772; 33/776

(58) Field of Classification Search .................... 33/700, 33/732, 734, 744, 747, 772, 776
See application file for complete search history.

(56) References Cited

U.S. PATENT DOCUMENTS

| | | | | |
|---|---|---|---|---|
| 2,091,177 A | * | 8/1937 | Drew | 33/747 |
| 3,758,954 A | * | 9/1973 | Teplitz | 33/776 |
| 5,067,248 A | * | 11/1991 | Nortenius et al. | 33/744 |
| 5,257,462 A | * | 11/1993 | Buttermann | 33/732 |
| 5,351,531 A | * | 10/1994 | Kerr | 33/734 |

FOREIGN PATENT DOCUMENTS

| | | |
|---|---|---|
| JP | 62-42046 U | 3/1987 |
| JP | 3-70303 U | 7/1991 |
| JP | 6-323801 A | 11/1994 |

* cited by examiner

*Primary Examiner* — G. Bradley Bennett
(74) *Attorney, Agent, or Firm* — Birch, Stewart, Kolasch & Birch, LLP

(57) ABSTRACT

A tape checking apparatus has a driving roller (42) interposed in a running path (L) of an endless tape (T) and a thickness-measuring device (44) disposed near the driving roller (42). The thickness-measuring device (44) measures the thickness of the endless tape (T) that is pinched between the driving roller (42) and a pinch roller (45).

10 Claims, 4 Drawing Sheets

TAPE CHECKING APPARATUS

CROSS REFERENCE TO RELATED APPLICATIONS

This application is a Continuation of PCT International Application No. PCT/JP2010/053548 filed on Mar. 4, 2010, which claims the benefit of Patent Application No. 2009-061168, filed in Japan on Mar. 13, 2009. The entire contents of all of the above applications are hereby incorporated by reference into the present application.

TECHNICAL FIELD

The present invention relates to a checking apparatus for checking endless tape such as garniture tape which is used, for example, in cigarette manufacturing.

BACKGROUND ART

A manufacturing machine for manufacturing cigarettes uses an endless garniture tape to wrap shred tobacco in wrapping paper. The dimensional accuracy of the garniture tape greatly affects the quality of cigarettes.

On this account, garniture tapes are measured in length, width, thickness, etc. prior to their use, and only the garniture tapes that meet the standards are used. In general, the dimensions of the garniture tape are directly measured by the operator using a measuring tool, such as a scale, a slide gauge, and a micrometer. However, the results of the measurement can vary depending upon the operator's level of skill.

Under the circumstances, a conventionally-known checking apparatus is automated to measure the length of an endless tape and the deflection (winding and deviation amounts) of the running tape (Patent Document 1).

PRIOR ART DOCUMENT

Patent Document

Patent Document 1: Unexamined Patent Publication No. 6-323801

SUMMARY OF THE INVENTION

Problem to be Solved by the Invention

The above-mentioned checking apparatus is designed to suit the measurement mainly of a toothed belt, but is not intended at all to be used to measure the width and thickness of the toothed belt. In this respect, variation in width and thickness of the garniture tape greatly affects the shred-tobacco wrapping performance, so that the checking apparatus disclosed in the above-mentioned publication is not suitable for measuring the garniture tape.

It is an object of the invention to provide a tape checking apparatus that is capable of measuring not only the length but thickness of an endless tape such as a garniture tape, and performing the measurement with accuracy.

Means for Solving the Problem

In order to achieve the object, a tape checking apparatus comprises a running path for guiding a run of an endless tape, the running path including a rotatable driving roller; a slide base arranged for moving toward and away from the driving roller; a roller train disposed in the slide base, the roller train forming a part of the running path and applying tensile force to the endless tape; and a length-measuring device and a thickness-measuring device interposed in the running path for measuring length and thickness of the endless tape, respectively. The thickness-measuring device includes a pinch roller for pressing the endless tape against a circumferential surface of the driving roller, and measures the thickness of the endless tape passing between the pinch roller and the driving roller.

With the tape checking apparatus, not only the length but the thickness of the endless tape is automatically measured while the tape is running. Since the thickness-measuring device measures the thickness of the endless tape pinched between the driving roller and the pinch roller, warpage or distortion of the endless tape does not adversely affect the result of measurement.

The slide base is movable in a horizontal direction, and the roller train extends in a vertical direction.

The tape checking apparatus may further comprise a crown roller interposed in the running path to be located on the upstream side of the driving roller, for guiding the run of the endless tape.

The tape checking apparatus may further comprise a width-measuring device for measuring width of the endless tape. The width-measuring device is placed in the running path where the endless tape runs from the crown roller towards the driving roller.

The tape checking apparatus may further comprise a deflection-measuring device for measuring deflection of the endless tape. The deflection-measuring device is placed in the running path where the endless tape runs from the crown roller towards the driving roller.

This makes it possible to measure not only the length and thickness but also the width and deflection of the endless tape. The endless tape is reliably guided by the crown roller to the width-measuring device and the deflection-measuring device, which ensures an accurate measurement of the width and deflection of the endless tape.

The length-measuring device preferably includes a linear scale for measuring a distance between the driving roller and the roller train.

The tape checking apparatus further comprises a guide roller disposed near the driving roller, for guiding the run of the endless tape. The guide roller determines a winding angle of the endless tape on the driving roller to 180 degrees or more, and the driving roller has a larger diameter than the guide roller.

The tape checking apparatus further comprises a measurement controller for controlling a running speed of the endless tape and a measurement timing of each the measuring device. The measurement controller makes the endless tape run at a preparatory speed being faster than a speed during measurement time in which the length, width, deflection and thickness of the endless tape are measured. After an elapse of a certain period of time, the measurement controller commences the measurement of the length, width, deflection and thickness in a state where the running speed of the endless tape is reduced to and maintained at the measurement-time speed. Since the preparatory operation is carried out, in which the endless tape runs at a faster speed than the measurement-time speed, prior to the actual measurement, the endless tape applied with tension is stabilized in tension and running course. This ensures high accuracy of the subsequent actual measurement.

The measurement controller may have a function to calibrate a measurement result of the deflection-measuring device immediately before measurement to a deflection amount of zero. In this case, the deflection amount of the endless tape can be accurately measured.

The measurement controller may further include setting means for arbitrarily setting an interval of measurement of width, deflection and thickness of the endless tape. This makes it possible to perform the measurement with a required measuring accuracy.

Technical Advantages of the Invention

The tape checking apparatus is capable of automatically measuring not only the length but the thickness of the endless tape without manual operation. The thickness-measuring device measures the thickness of the endless tape pinched between the driving roller and the pinch roller, and therefore accurately measures the thickness of the endless tape, regardless of warpage or distortion of the endless tape.

BEST MODE FOR CARRYING OUT THE INVENTION

Figure 1:
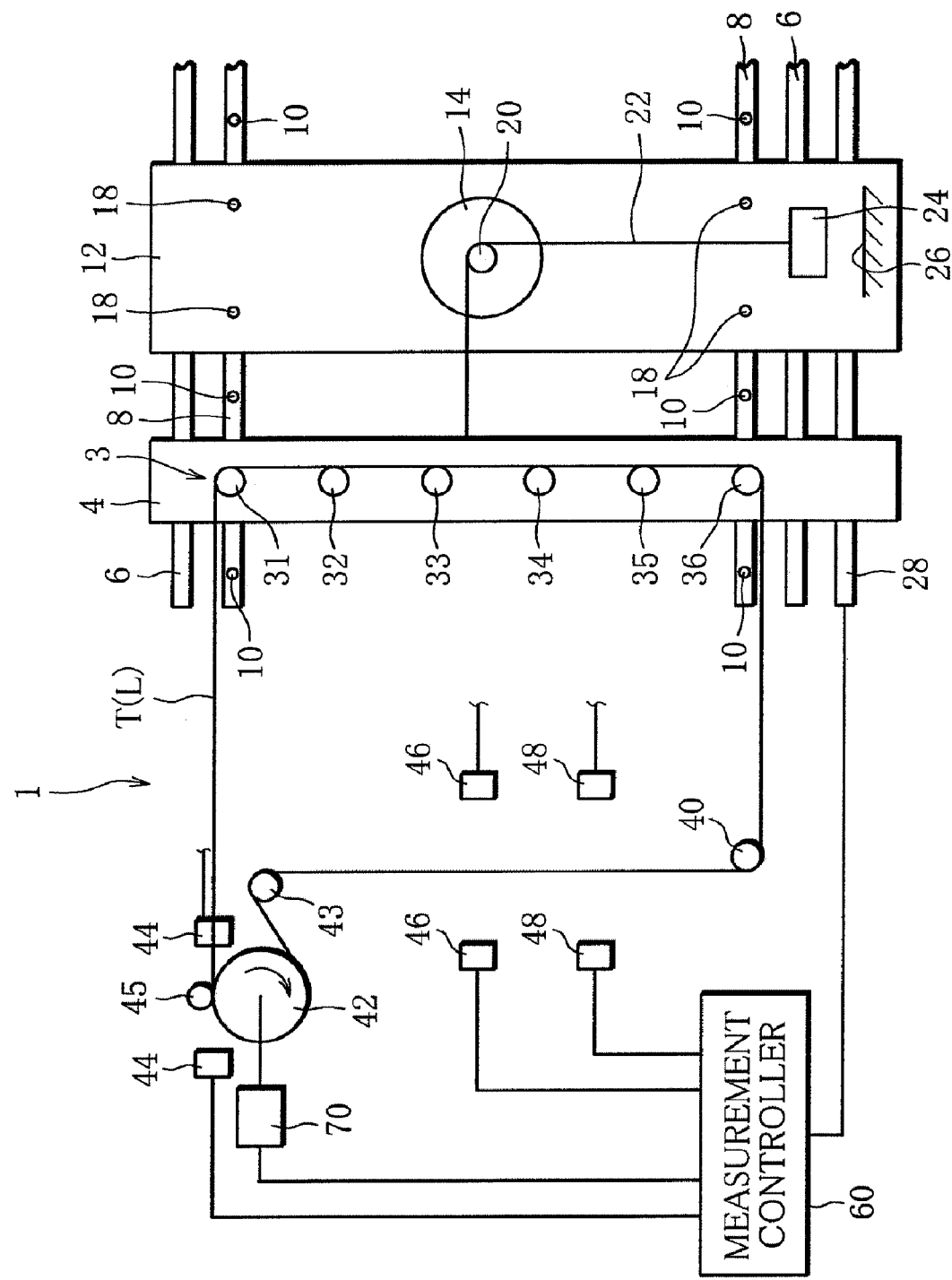
FIG. 1 is an elevation view of a tape checking apparatus according to a first embodiment of the invention.

A tape checking apparatus 1 of FIG. 1 has a front slide base 4 that is used for simultaneous measurement of length, thickness, width and deflection of an endless tape such as a garniture tape and extends in a vertical direction. A roller train 3 is mounted on the front slide base 4 and extends in a vertical direction. More specifically, the roller train 3 includes rollers 31, 32, 33, 34, 35 and 36, in the order named from above downward. These rollers are vertically arranged with spaces in between and rotatably supported by the front slide base 4.

The front slide base 4 is supported by upper and lower guide rails 6. The guide rails 6 extend in a horizontal direction. The front slide base 4, or the roller train 3, is therefore allowed to reciprocate along the guide rails 6 in the horizontal direction.

As viewed in FIG. 1, a rear slide base 12 is placed on the right side of the front slide base 4. The rear slide base 12 extends parallel to the front slide base 4, that is, in the vertical direction, and is movably supported by the guide rails 6 as with the front slide base 4. A pair of fixed rails 8 are placed between the upper and lower guide rails 6. The fixed rails 8 extend close to and parallel with their respective guide rails 6.

Holes 10 are formed in each of the fixed rails 8 at predetermined intervals in a longitudinal direction of the fixed rails 8. The rear slide base 12 is provided with holes 18 in its upper and lower portions. If the upper and lower holes 18 of the rear slide base 12 are made to coincide with predetermined holes 10 of their respective fixed rails 8, and stoppers, not shown, are inserted into the holes 18 and 10, the rear slide base 12 can be fixed at a desired position relative to the fixed rails 8.

A disc-like switch handle 14 is rotatably installed in the center of the rear slide base 12 as viewed in the vertical direction through a handle shaft 20. The switch handle 14 has a stopper, not shown. The stopper holds the switch handle 14 at a predetermined rotation angle. A support platform 26 is situated under the rear slide base 12. The support platform 26 is movable in a vertical direction relative to the rear slide base 12 along with the rotation of the switch handle 14.

As is apparent from FIG. 1, a wire 22 is wound around the handle shaft 20 of the switch handle 14. The wire 22 connects the front slide base 4 and a weight 24 to each other. In the state shown in the drawing, the weight 24 pulls the front slide base 4 towards the rear slide base 12 through the wire 22. From this state, if the switch handle 14 is rotated, the support platform 26 is raised up to the weight 24 to support the weight 24. At this point of time, the pulling of the front slide base 4 by the weight 24 is released.

The front slide base 4 and the rear slide base 12 are independent of each other. For this reason, the front slide base 4 that is released from the pulling by the weight 24 can freely move along guide rails 6, which facilitate the exchange of a garniture tape T mentioned below.

As viewed in FIG. 1, a driving roller 42 is located on the left side of the front slide base 4. The driving roller 42 is installed so that the highest point of a circumferential face thereof is on the same level in height as the highest point of a circumferential face of the roller 31 located at the top of the roller train 3. An electric motor 70 is connected to the driving roller 42. The electric motor 70 rotates the driving roller 42 clockwise as viewed in FIG. 1.

A crown roller 40 is also installed on the left side of the front slide base 4. The crown roller 40 is located between the driving roller 42 and the front slide base 4 to be situated nearer the driving roller 42 in relation to the front slide base 4. The crown roller 40 is installed so that the lowest point of a circumferential face thereof is on the same level in height as the lowest point of a circumferential face of the roller 36 located at the bottom of the roller train 3.

Above the crown roller 40, a guide roller 43 is placed on the right side of the driving roller 42. The guide roller 43 has a smaller diameter than the driving roller 42, and is installed so that the axis thereof is on the same level in height as the axis of the driving roller 42.

As shown in FIG. 1, the driving roller 42, the rollers of the roller train 3, the crown roller 40 and the guide roller 43 define a running path L of an endless garniture tape T. The garniture tape T extends along the running path L. To be specific, the garniture tape T has an upper horizontal section horizontally extending between the driving roller 42 and the roller 31, a lower horizontal section horizontally extending between the roller 36 and the crown roller 40, and a vertical section vertically extending between the crown roller 40 and the guide roller 43. The guide roller 43 serves to enlarge a winding angle of the garniture tape T relative to the driving roller 42.

In the state where the garniture tape T extends along the running path L, if the front slide base 4 is pulled by the weight 24 towards the rear slide base 12, the garniture tape T is applied with tensile force corresponding to the weight 24. If the driving roller 42 is rotated in this state, the garniture tape T runs in one direction along the running path L while being tensioned.

Various measuring devices for measuring the dimensions of the garniture tape T and a deflection of the running garniture tape T will be described below.

First of all, a linear scale 28 is placed under the lower guide rail 6, and extends parallel to the guide rails 6. The linear scale 28 measures distance between the driving roller 42 and the front slide base 4. Once this distance is measured, the length of the running path L of the garniture tape T, namely, the length of the garniture tape T, can be measured.

A width-measuring device 46 and a deflection-measuring device 48 are placed one above the other between the crown roller 40 and the guide roller 43. The width-measuring device 46 is capable of measuring the width of the garniture tape T, whereas the deflection-measuring device 48 is capable of measuring the deflection of the garniture tape T while the garniture tape T is running. More specifically, the width-measuring device 46 and the deflection-measuring device 48 each have a light source and a CCD camera which are disposed across the vertical section of the garniture tape T. The width and deflection of the garniture tape T are measured on the basis of image data of the garniture tape T, which is photographed by the CCD camera.

The crown roller 40 located upstream of the width-measuring device 46 and the deflection-measuring device 48 has a function to automatically correct a deviation of the garniture tape T from the running path L (centering function). This enables the width-measuring device 46 and the deflection-measuring device 48 to measure the width and deflection of the garniture tape T with more accuracy.

A pinch roller 45 is set immediately above the driving roller 42. The pinch roller 45 is supported to be displaceable in the vertical direction, and pinches the garniture tape T between itself and the driving roller 42. A thickness-measuring device 44 is placed near the pinch roller 45. The thickness-measuring device 44 is also formed of a light source and a CCD camera which are disposed across the pinch roller 45. The thickness-measuring device 44 uses the CCD camera to photograph the garniture tape T passing between the driving roller 42 and the pinch roller 45, and measures the thickness of the garniture tape T on the basis of the image data obtained by the photographing.

Since the garniture tape T is pinched between the driving roller 42 and the pinch roller 45, warpage or distortion of the garniture tape T does not affect the measurement, and therefore, the thickness of the garniture tape T is accurately measured.

Figure 2:
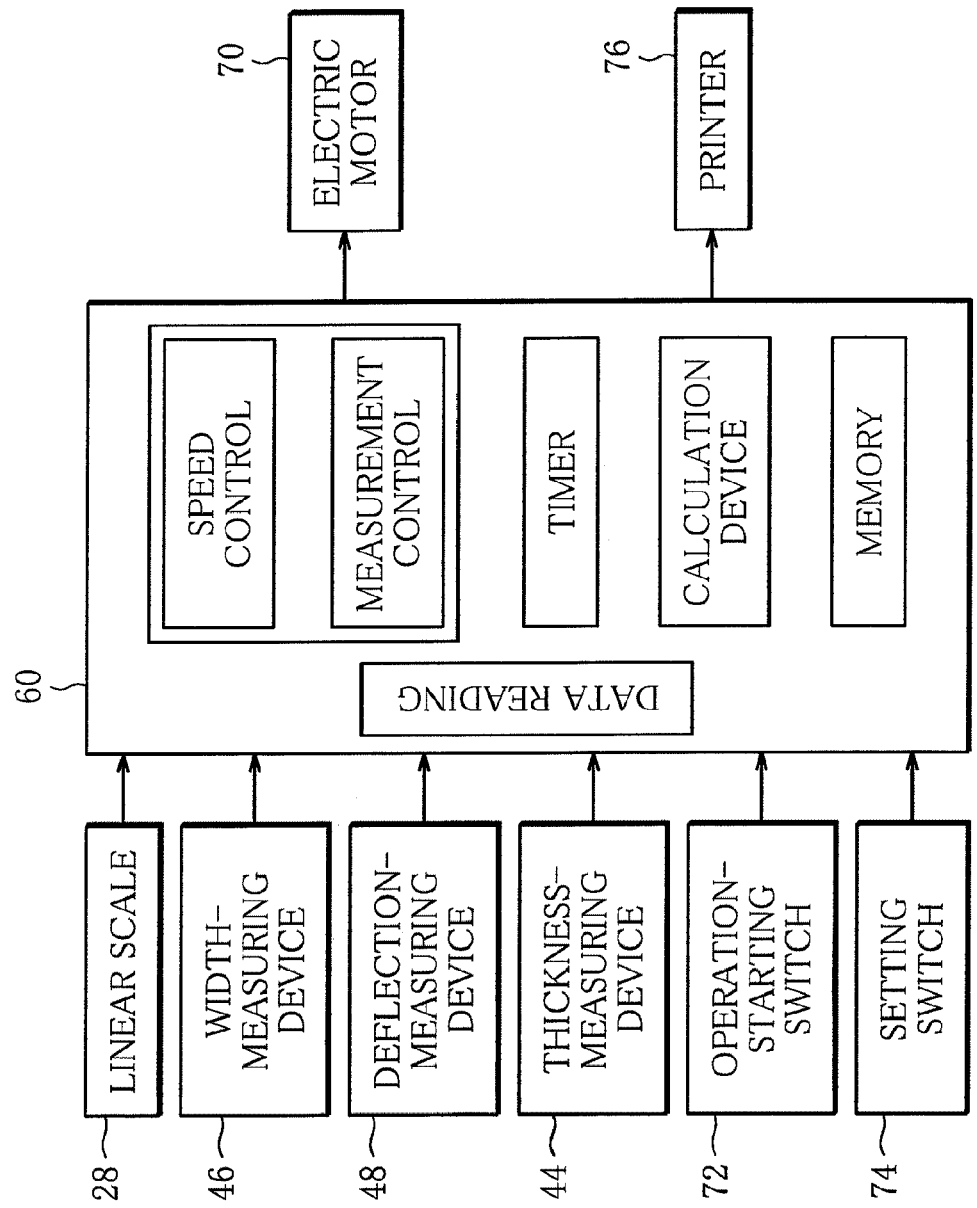
FIG. 2 is a block diagram schematically showing the tape checking apparatus of FIG. 1.

As shown in FIG. 2, a measurement controller 60 is connected through serial communication lines not only to the electric motor 70, the linear scale 28, the width-measuring device 46, the deflection-measuring device 48 and the thickness-measuring device 44, but also to a switch 72 for starting an operation, a setting switch 74 for setting measurement intervals, a printer 76 for outputting a measurement result, and a display, not shown. After the operation-starting switch 72 is turned ON, the measurement controller 60 of the present embodiment exerts a function to control the running speed of the garniture tape T in addition to a function to control the measurement of the garniture tape T. In other words, the measurement controller 60 concurrently implements measurement control and speed control on the garniture tape T. In other words, while controlling the running speed of the garniture tape T, the measurement controller 60 reads the detected signals (data) transmitted from the linear scale 28 and the measuring devices 44, 46 and 48, and starts the measurement of dimensions and deflection of the garniture tape T. In order to exert both these control functions, the measurement controller 60 includes a timer, and further has a function to calibrate the deflection-measuring device 48.

Figure 3:
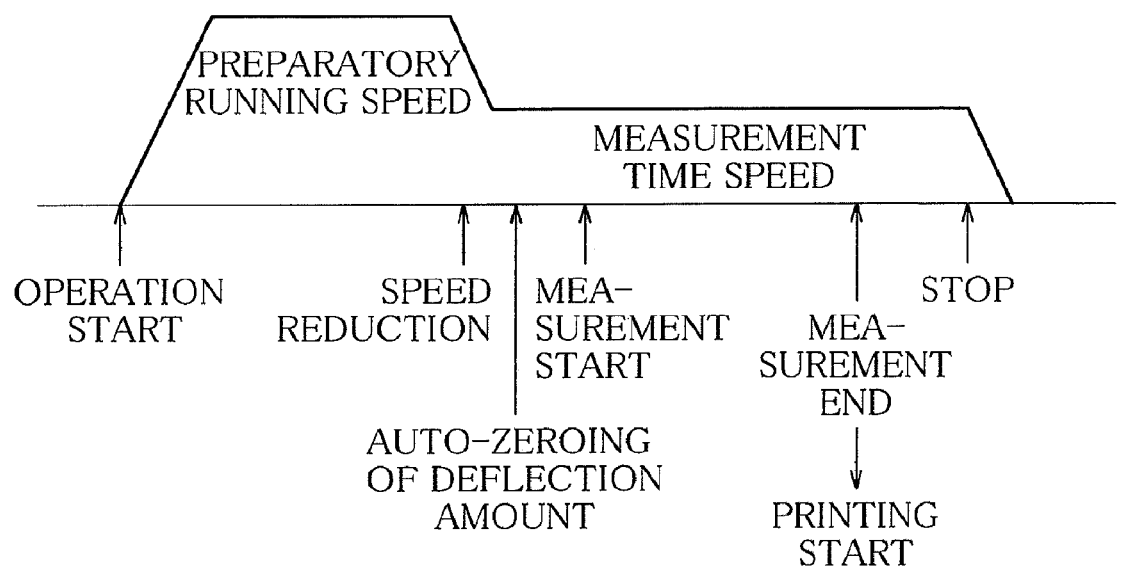
FIG. 3 is a graph showing the procedure of measurement performed by the tape checking apparatus shown in FIGS. 1 and 2.

To be more specific, after the operation-starting switch 72 is turned ON as shown in FIG. 3, the measurement controller 60 implements the preparatory run of the garniture tape T for a predetermined duration prior to the start of the measurement. The duration of the preparatory run is measured by the timer. The speed of the preparatory run is set faster than the measurement-time speed of the garniture tape T during the measurement mentioned later. The preparatory run stabilizes the tension and running course of the garniture tape T provided with tensile force, and is thus effective to perform the subsequent measurement of the garniture tape T with high accuracy.

When the preparatory run is ended, the measurement controller 60 reduces the running speed of the garniture tape T to the measurement-time speed and maintains the running speed at the measurement-time speed. At this point of time, the measurement controller 60 indicates on a display, not shown, thereof that the measurement has been started.

Thereafter, when an elapse of a predetermined time period is measured by the timer, the measurement controller 60 automatically carries out an auto-zeroing function that zeros a deflection amount measured by the deflection-measuring device 48 and thus calibrates the deflection-measuring device 48.

When the measurement is ready, the timer measures the elapse of a given length of time, and the measurement controller 60 indicates on the display that the measurement is in process. Meanwhile, the detected signals transmitted from the linear scale 28, the width-measuring device 46, the deflection-measuring device 48 and the thickness-measuring device 44, namely, measured data, is read in at the measurement intervals preset by the setting switch 74, for example, every 100 ms.

The measurement controller 60 further includes a calculation device. The calculation device calculates maximum and minimum values of the length, width, deflection, and thickness of the garniture tape T on the basis of measured data that has been read in, and then stores a calculation result in a memory.

At the time point when the entire length of the garniture tape T, namely, the measured data of one round of the garniture tape T, is collected by the measurement controller 60, that is, at the elapse of measurement time mentioned below, the measurement controller 60 stops the run of the garniture tape T, and indicates on the display a measurement result and that the measurement is finished. At the same time, the measurement controller 60 causes the printer 76 to print out the measurement result as occasion demands.

Prior to the foregoing measurement, the measurement controller 60 beforehand automatically calculates the measurement time on the basis of predetermined length and measurement-time speed of the garniture tape T. The measurement controller 60 may arbitrarily set the measurement intervals, or reading intervals, of each data, and also may easily vary a measurement accuracy if necessary.

For example, in order to measure every 10 mm of the garniture tape T, the measured data is read in every 100 ms, and the measurement-time speed of the garniture tape T is 6 m/min. If the measurement-time speed of the garniture tape T is doubled, the measured data is read in with respect to every 20 mm.

Since the measurement of the garniture tape T is automatically carried out in the running process of the garniture tape T as described above, it is possible to resolve variations of the measurement result, which are unavoidable when a measurer uses measuring tools to perform measurement. It is also possible to measure the length, width, deflection and thickness of the garniture tape T simultaneously in a short period of time.

A tape checking apparatus of a second embodiment will be described below with reference to FIG. 4.

The checking apparatus of the second embodiment further has a fixed roller train 5. The roller train 5 is disposed between the roller train 3 and the crown roller 40, extending parallel with the roller train 3.

To be more specific, the roller train 5 includes four rollers 51, 52, 53 and 54. When viewed at their height, the rollers 51, 52, 53 and 54 are located between the rollers 31 and 32, between the rollers 32 and 33, between the rollers 34 and 35, and between the rollers 35 and 36, respectively.

Figure 4:
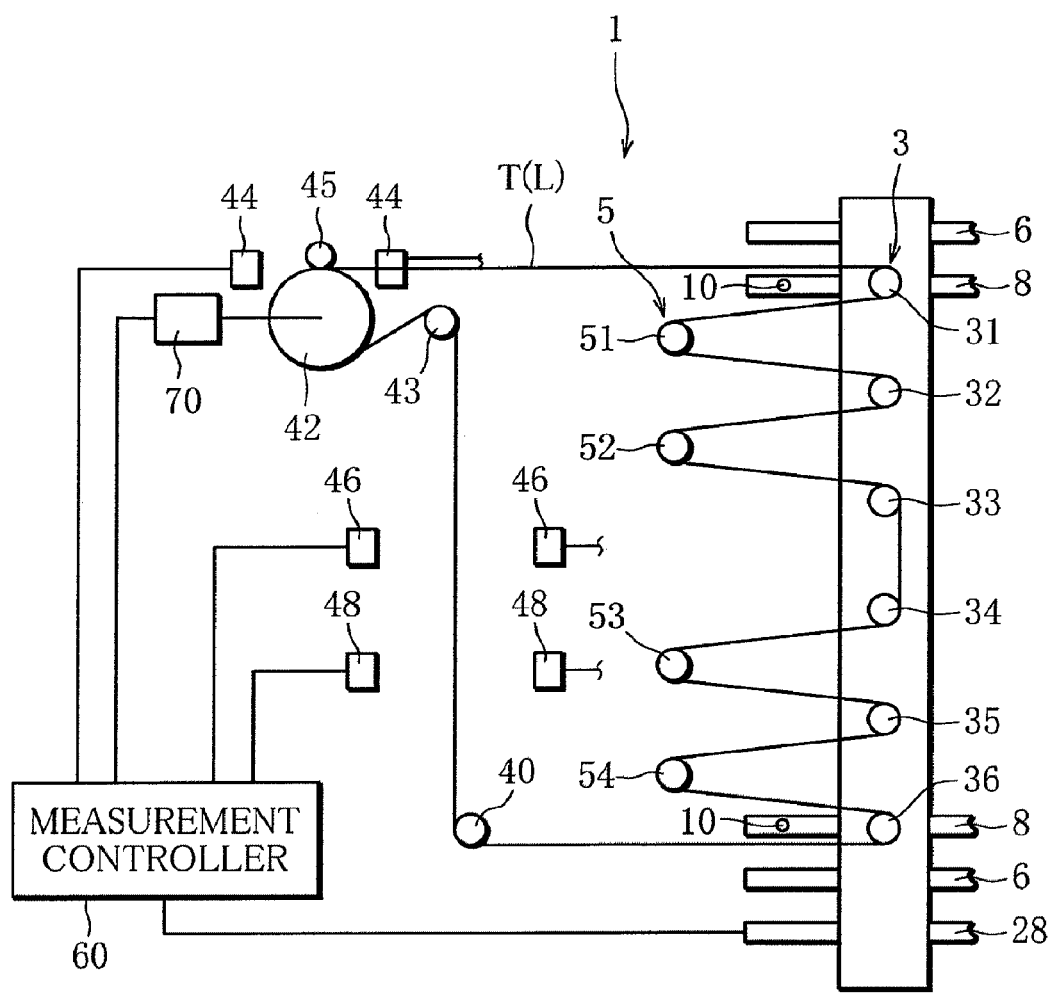
FIG. 4 is an elevation view of a tape checking apparatus according to a second embodiment of the invention.

With the roller train 5, the garniture tape T can be hung alternately between the roller train 3 and the roller train 5 as shown in FIG. 4. This enables to elongate the running path L, and even the garniture tape T increased in length can be measured in the same manner as in the first embodiment.

The invention is not limited to the embodiments, and may be modified without deviating from the technical idea thereof. For example, the invention is applicable not only to the measurement of the garniture tape but also to that of various kinds of endless tapes.

REFERENCE MARKS 1 tape checking apparatus
3 roller train
4 front slide base
5 roller train
6 guide rail
8 fixed rail
10 hole
12 rear slide base
14 switch handle
18 hole
28 linear scale
40 crown roller
42 driving roller
43 guide roller
44 thickness-measuring device
45 pinch roller
46 width-measuring device
48 deflection-measuring device
60 measurement controller
70 motor
L running path
T garniture tape

The invention claimed is:

1. A tape checking apparatus comprising:
a running path for guiding a run of an endless tape, said running path including a rotatable driving roller;
a slide base arranged for moving toward and away from the driving roller;
a roller train disposed in said slide base, said roller train forming a part of said running path and applying tensile force to the endless tape; and
a length-measuring device and a thickness-measuring device interposed in said running path for measuring length and thickness of the endless tape, respectively, wherein:
said thickness-measuring device includes a pinch roller for pressing the endless tape against a circumferential surface of the driving roller, and measures the thickness of the endless tape passing between the pinch roller and the driving roller.

2. The tape checking apparatus according to claim 1, wherein said slide base is movable in a horizontal direction, and said roller train extends in a vertical direction.

3. The tape checking apparatus according to claim 2, further comprising:
a crown roller interposed in the running path to be located on the upstream side of the driving roller, for guiding the run of the endless tape.

4. The tape checking apparatus according to claim 3, further comprising:
a width-measuring device for measuring width of the endless tape, wherein:
said width-measuring device is placed in said running path where the endless tape runs from said crown roller towards the driving roller.

5. The tape checking apparatus according to claim 3, further comprising:
a deflection-measuring device for measuring deflection of the endless tape, wherein:
said deflection-measuring device is placed in said running path where the endless tape runs from said crown roller towards the driving roller.

6. The tape checking apparatus according to claim 1, wherein said length-measuring device includes a linear scale for measuring a distance between the driving roller and said roller train.

7. The tape checking apparatus according to claim 1, further comprising:
a guide roller disposed near the driving roller, for guiding the run of the endless tape, wherein:
said guide roller determines a winding angle of the endless tape on the driving roller to 180 degrees or more, and the driving roller has a larger diameter than said guide roller.

8. The tape checking apparatus according to claim 5, further comprising:
a measurement controller for controlling a running speed of the endless tape and a measurement timing of each said measuring device, wherein:
said measurement controller makes the endless tape run at a preparatory speed being faster than a speed during measurement time in which the length, width, deflection and thickness of the endless tape are measured; and after an elapse of a certain period of time, said measurement controller commences the measurement of the length, width, deflection and thickness in a state where the running speed of the endless tape is reduced to and maintained at the measurement-time speed.

9. The tape checking apparatus according to claim 8, wherein said measurement controller has a function to calibrate a measurement result of said deflection-measuring device immediately before measurement to a deflection amount of zero.

10. The tape checking apparatus according to claim 8, wherein said measurement controller includes setting means for arbitrarily setting an interval of measurement of width, deflection and thickness of the endless tape.

* * * * *